March 2, 1943. L. J. HARRISS ET AL 2,312,814

METHOD AND APPARATUS FOR MAKING PIES

Filed May 16, 1941 2 Sheets-Sheet 1

INVENTORS
Lloyd J. Harriss
Bernard Lambers
BY
Attys.

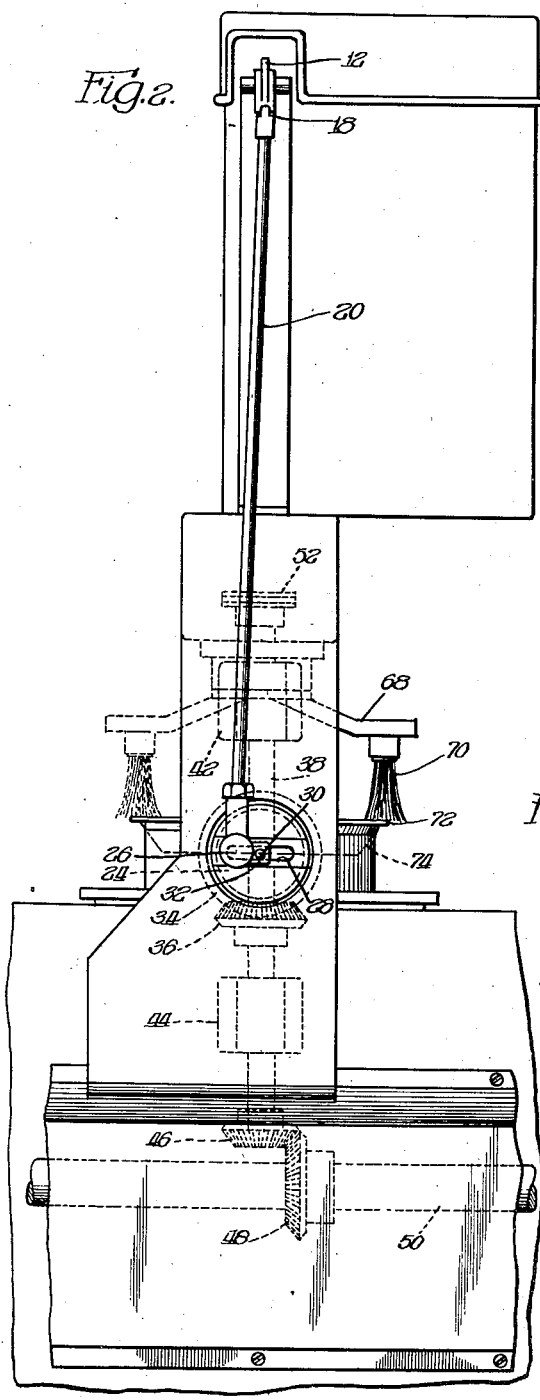
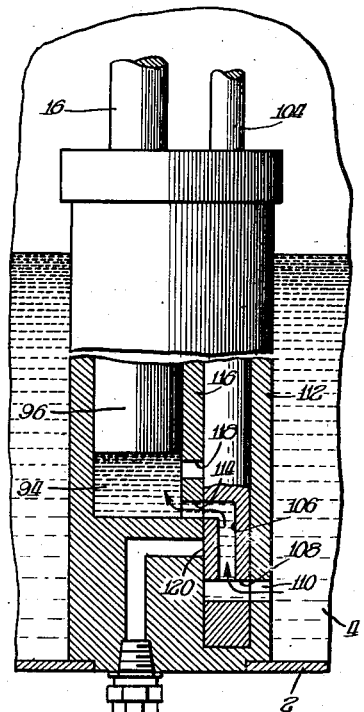
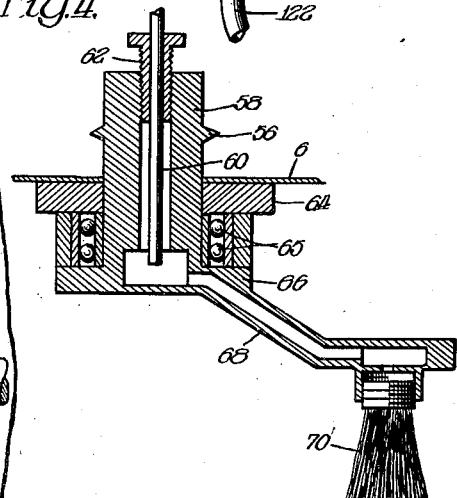
INVENTOR.
Lloyd J. Harriss
Bernard Lambers

Patented Mar. 2, 1943

2,312,814

UNITED STATES PATENT OFFICE 2,312,814

METHOD AND APPARATUS FOR MAKING PIES

Lloyd J. Harriss, Kenilworth, and Bernard Lambers, Oak Park, Ill.; said Lambers assignor to said Harriss Application May 16, 1941, Serial No. 393,737

11 Claims. (Cl. 107—54)

This invention relates to a method and apparatus for making pies and more particularly to a method and apparatus for applying a predetermined amount of water, or other moistening liquid, to a pie crust at a predetermined time.

The present invention is especially concerned with the moistening of a pie crust prior to baking and while the pie crust is being carried in a pie pan on a conveyor system. It is well known to apply water to unbaked pie crusts by means of a brush, or other suitable utensil. However, it is important that just the right amount of water be applied, hence the need for the present invention.

One of the objects of the invention is to insure that just the right amount of moisture is applied to the surface of a pie crust.

Another object of the invention is to provide a new and improved means for quantitatively measuring and predetermining the amount of water to be applied to a pie crust, together with apparatus for applying the exact amount of water at the proper rate and at the proper time.

Another object of the invention is to provide a device of the character described having means for varying the amount of water applied in accordance with varying conditions of use.

Other objects and advantages of the invention will be apparent by reference to the following description in conjunction with the accompanying drawings, in which:

Figure 2 is a side view of the apparatus shown in Figure 1;

Figure 3 represents an enlarged view, partly in section, of one portion of the apparatus shown in Figure 1; and Figure 4 represents an enlarged detailed view, partly in section, of another portion of the apparatus shown in Figure 1.

Figure 1:
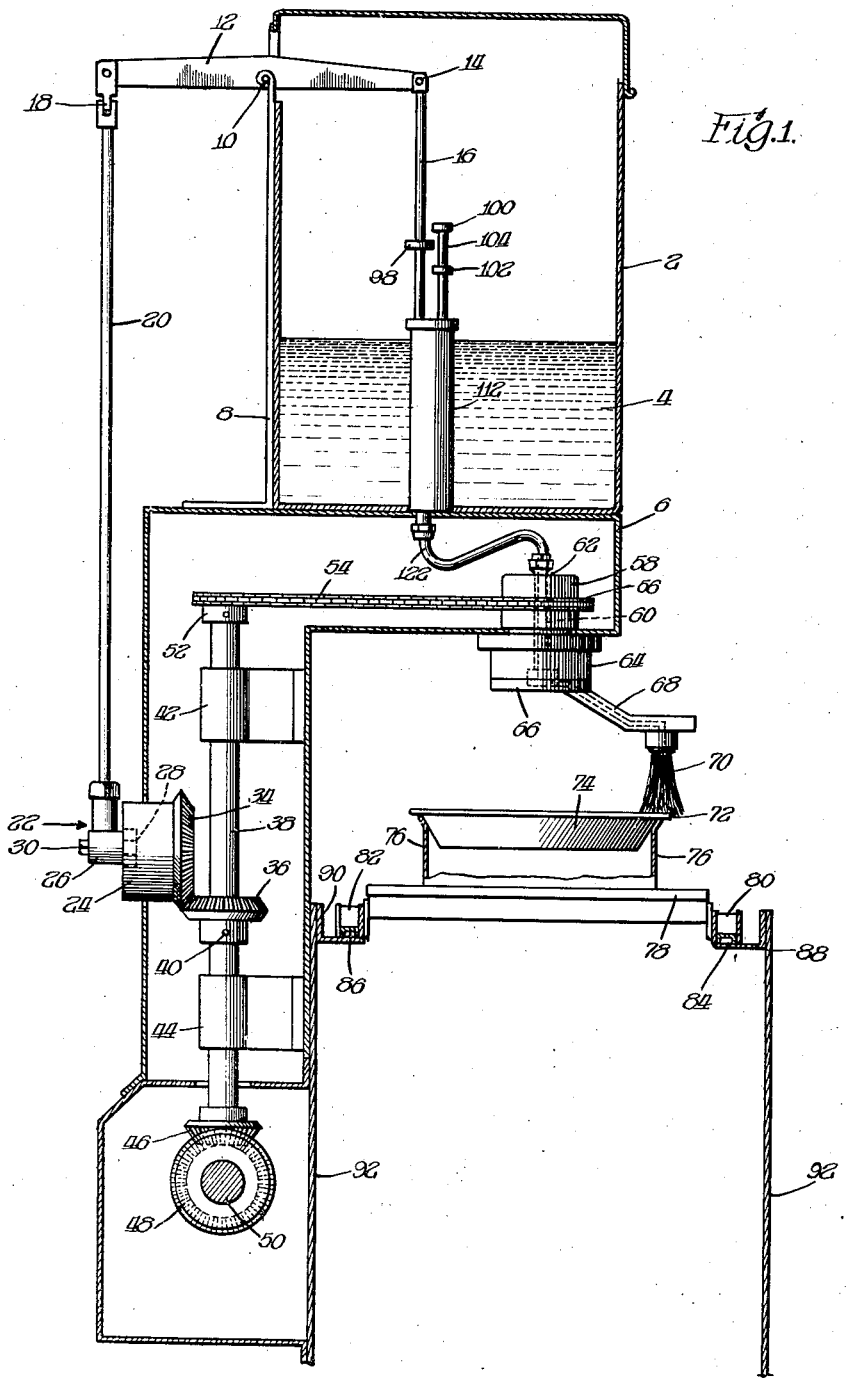
Figure 1 represents an elevational view, partly in section, of one form of apparatus for practicing the invention.

The apparatus illustrated in Figure 1 comprises a tank or vessel 2 containing water 4, or other moistening liquid. The tank 2 is supported on a frame 6. Attached to the upper part of the frame 6 is an L-shaped member 8 which extends upwardly and forms a fulcrum at point 10 for an arm 12. The arm 12 is connected by any suitable connecting means at point 12 with a plunger element 16. The other end of the arm 12 is connected at point 18 to a shaft 20 which is reciprocably driven through a connection 22 to a driving element 24. The connection is effected by the projecting arm 26 of the connecting element engaging in a slot 28 of the driving element. The stroke of the drive shaft 20 is regulated by means of a set screw 30 which may be set in a predetermined position in the slot 28 and thereby govern the distance that the arm 26 may move away from the center 32 of the driving element 24. It will be apparent that when the arm 26 is at the center of the driving element 24, that is to say, at point 32, no reciprocating motion will be imparted to the shaft 20. As the arm 26 is permitted to move farther and farther away from the center 32, the amount of reciprocating motion imparted to the shaft 20 becomes greater and greater and is only limited by the length of the slot 28 and the setting of set screw 30. The driving element 24 is provided with a bevel gear 34 which meshes with another bevel gear 36 mounted on the shaft 38. The bevel gear 36 is fixed to the shaft 38 by means of the set screw 40. The shaft 38 is supported from the frame 6 by supporting elements 42 and 44. On the lower end of the shaft 38 is fixed a bevel gear 46 which engages with another bevel gear 48 fixed to a drive shaft 50 driven by a motor or any other suitable driving means. The upper end of the shaft 38 is provided with a sprocket 52 which is fixed to the shaft 38 and engages with a chain 54.

The chain 54 is drivingly engaged with another sprocket at point 56 associated or fixed to a hollow shaft 58. Through the hollow shaft 58 runs a water line 60. At the upper end of the hollow shaft 58 is provided a stuffing box 62, as more clearly shown in Figure 4. The hollow shaft 58 is supported by a fixed hub 64 riveted, or otherwise attached beneath the frame 6. Ball bearings 65, as shown in Figure 4, are preferably provided to assist in the rotation of the shaft 58 within the hub 64. The hub 64 may be packed with grease or other lubricant. The lower part of the shaft 58 is provided with a flanged element 66 to which is attached an arm 68 carrying a brush 70. As shown, the water line 60 passes through shaft 58 to a well 57 from which there is a channel in the flanged element 66 and the arm 68 to the upper part of the brush 70. The brush 70 may be of any suitable type having bristles for permitting the water to flow downwardly and finally to be applied from the end of the brush to the edge of a pie crust 72. The pie crust 72 is carried in a pie pan 74 which in turn is supported by upright elements 76. The elements 76 are carried by a supporting element 78, which in turn is attached to sprocket chains 80 and 82. Chains 80 and 82 ride on tracks 84 and 86 supported by L-shaped members 88 and 90, respectively. The L-shaped members 88 and 90 are in turn supported by the frame 92 of the conveyor system.

The amount of water applied to the top of the pie crust 72 is controlled by the amount of water delivered from chamber 94, as shown in Figure 3. This in turn is governed by the stroke of piston 96 and the stroke of piston 96 is governed by the movement of lever arm 20, shown in Figure 1, which is controlled by the setting of the set screw 30, shown in Figure 2.

The piston 96, shown in Figure 3, is moved by the piston rod 16 which carries an element 98 engageable when moved upwardly with an element 100 and when moved downwardly with an element 102 fixed to a valve stem 104. Since the element 98 is fixed to the piston rod 16, it will move the valve stem 104 upwardly at one point in its cycle due to engagement with the element 100, and downwardly at another point in its cycle due to engagement with the element 102.

As shown in Figure 3, the valve stem 104 is provided at its lower end with a pair of channels or passages 106 and 108. When the valve stem 104 is in its lower position, as shown in Figure 3, the channel 108 will coincide with the opening 110 in the housing 112 and the upper part of the channel 106 will coincide with the opening 114 in the separating wall 116. At this point there is a channel or passageway for the water 4 contained in the large vessel 2 to pass through the opening 110 into the passage 108 then into the passage 106 and finally through the opening 114 into the piston chamber 94. At the time when this position is just attained, the element 98 is against the top of the element 102 and has reached the bottom of its cycle. At the same time the rod 20 is at upper dead center of the rotating element 24. Thereafter the rod 20 begins to descend due to the continued rotation of the element 24, causing the arm 12 to move around the fulcrum 10 and thereby raise the piston rod 16. As the piston rod 16 is raised, water is drawn into the chamber 94 due to the suction. When the element 98 on the piston rod 16 comes into contact with the element 100 on the valve stem 104, it begins to raise the latter and close the ports 110 and 114. The valve stem 104 continues to be raised until the upper part of the passageway 106 is opposite the port 118. At the same time the lower passageway 108 of the valve will be opposite the port 120. As soon as this position is reached, the arm 20 has reached lower dead center on the rotating element 24 and the upward movement of the piston rod 16 will cease. A passageway is then provided through the port 118, the passage 106, the passage 108 and the port 120 to a line 122 connected to the top of the channel or passageway 60 through the hollow shaft 58.

As the rotation of the member 24 continues, the shaft 20 again ascends, causing the piston rod 16 to descend and thereby force the water out of the chamber 94 through the line 122 and the channel 60 in the hollow shaft 58, thence through the channel in the arm 68 to the applicator brush 70. In this way a predetermined amount of water, or if desired, any other liquid, is supplied to the upper surface of the pie crust 72. Since the piston 96 (Figure 3) descends gradually and inasmuch as the brush 70 is constantly rotated, water is supplied gradually and uniformly to the top of the pie crust. It will be observed that the rotation of the brush 70 about the hollow shaft 58 and the movement of the piston 96 are both effected and synchronized by the rotation of the shaft 38. The synchronism of these elements makes it possible to add just the right amount of water at the proper rate during one complete cycle of the rotating brush 70. At the same time, rotating element 24 with its associated shaft 20 causes the arms 12 and the piston rod 16 to move the piston 96 through one compression stroke. By changing the gear ratio of the gears 52 and 56, the rate of rotation of the brush 70 may be varied. Thus, in some cases it may be desirable to have the brush 70 rotate around the rim of the pie crust four times during one cycle of rotation of the rotary member 24 thereby adding the water more gradually and permitting the crust to absorb a portion of the water before the addition of the remainder.

As previously indicated, the amount of water added may be varied merely by loosening the set screw 30 and moving the arm 26 in or out of the slot 28 toward or away from the axis of rotation of the rotary element 24.

The invention is particularly suited for use in conjunction with a conveyor system, a portion of which is shown in Figures 1 and 2 wherein pie pans containing the crusts are intermittently advanced beneath the rotating brush 70, allowed to remain beneath said brush sufficiently long to permit the application of the water and then conveyed by the conveyor system to another station. The conveyance of the pie crust to and from a station beneath the water applying brush 70 is preferably synchronized with the movement of the brush 70 so that although the brush 70 rotates continuously, no water will be dispensed therefrom until the pie crust is in position thereunder. A preferred method of operation is to synchronize the rotation of the brush 70 with the reciprocation of piston 94 so that the brush is going through two complete revolutions while the piston is going through one complete cycle. For example, the brush 70 makes one revolution while the shaft 20 is moving from upper dead center to lower dead center. During this time the water is applied to a pie crust. As the shaft 20 moves from lower dead center to upper dead center, an additional quantity of water is being measured and the brush 70 goes through another revolution but without applying any water. At the same time the conveyor system moves the watered crust away and a new crust into position.

The main drive shaft 50 is also preferably the drive shaft for the conveyor sprocket chains 80 and 82 through any suitable intermittent motion mechanism, not shown. However, the conveyor and the liquid applicator may be driven from different motors.

It will be understood that certain variations and modifications may be made in the invention described without departing therefrom.

Having thus described the invention, what we claim as new and desire to secure by Letters Patent of the United States is:

1. In combination with a conveyor system for preparing a pastry, a device for applying a predetermined amount of liquid to said pastry, said device comprising a measuring chamber for said liquid, a movable element for applying the liquid to said pastry, means for flowing the liquid from said measuring chamber to said movable element, control means for controlling the flow of said liquid from said chamber to said element, a driving mechanism, means operatively associated with said driving mechanism for moving said element, and means operatively associated with said driving mechanism for actuating said control means at predetermined intervals in synchronism with the movement of said element.

2. In combination with a conveyor system for preparing pastry prior to baking in which the pastry is advanced past fixed working stations, a device at one of said stations for applying a predetermined amount of liquid to said pastry, said device comprising a measuring chamber for said liquid, inlet means and outlet means in said chamber, a liquid reservoir, a rotatable distributing element for distributing the liquid to said pastry, a valve connecting said liquid reservoir to said inlet means while closing said outlet means and connecting said outlet means to said distributing element while closing said inlet means, a driving mechanism, means operatively associated with said driving mechanism for rotating said distributing element, and means operatively associated with said driving mechanism for actuating said valve at predetermined intervals in synchronism with the rotation of said distributing element.

3. In combination with a conveyor system for preparing a pastry, a device for applying a predetermined amount of liquid to said pastry, said device comprising a measuring chamber for said liquid, a movable applicator element for applying the liquid to said pastry, means for flowing the liquid from said measuring chamber to said applicator element, a reciprocating piston in said measuring chamber, a valve controlling the flow of liquid to said measuring chamber from a reservoir and to said applicator element from said measuring chamber, a driving mechanism, means operatively associated with said driving mechanism for moving said applicator element, means operatively associated with said driving mechanism for reciprocating said piston in synchronism with the movement of said applicator element, and means responsive to the movement of said piston for actuating said valve at predetermined intervals during the movement of said applicator element.

4. In combination with a conveyor system for preparing pies prior to baking in which the pie crust supported by a pie pan is advanced past fixed working stations in a step by step movement, a device at one of said stations for applying a predetermined amount of liquid to that portion of the pie crust supported by the rim of the pie pan, said device comprising a measuring chamber for said liquid, a rotatable distributing element comprising a brush movable in contact with that portion of the pie crust supported by the rim of the pie pan and in an orbit substantially corresponding to the periphery of the pie crust, a reciprocating piston in said measuring chamber fitting relatively closely to the walls thereof and having a cycle comprising a suction and a compression stroke, a conduit from said measuring chamber to said distributing element, a reservoir surrounding said measuring chamber, a valve controlling the flow of liquid to said measuring chamber from said reservoir and to said distributing element from said measuring chamber, a driving mechanism, means operatively associated with said driving mechanism for rotating said distributing element, means operatively associated with said driving mechanism for reciprocating said piston in synchronism with the rotation of said distributing element, means responsive to the movement of said piston for actuating said valve at predetermined intervals during the rotation of said distributing element, said means being synchronized to open said valve to permit the flow of liquid from said reservoir to said measuring chamber during said suction stroke of said piston while simultaneously closing the conduit to said distributing element and to close said valve to said reservoir while opening said conduit during the compression stroke of said piston, and means for successively advancing said pie pans during the suction stroke of said piston.

5. A device for applying a predetermined amount of liquid to a pastry, said device comprising a measuring chamber for said liquid, a movable element for applying the liquid to said pastry, means for flowing said liquid from said measuring chamber to said element, control means for controlling the flow of liquid from said chamber to said element, a driving mechanism, means operatively associated with said driving mechanism for moving said element, and means operatively associated with said driving mechanism for actuating said control means at predetermined intervals in synchronism with the movement of said element.

6. A device for applying a predetermined amount of liquid to a pastry, said device comprising a measuring chamber for said liquid, inlet means and outlet means in said chamber, a rotatable distributing element for distributing the liquid to said pastry, a conduit between said outlet means and said distributing element, a driving mechanism, means operatively associated with said driving mechanism for rotating said distributing element, and means responsive to said driving mechanism for connecting said inlet means of said measuring chamber to a source of liquid while simultaneously closing said outlet means and for opening said outlet means at predetermined intervals in synchronism with the rotation of said distributing element.

7. A device for wetting the peripheral edges of a pie crust, said device comprising a measuring chamber for a wetting liquid, a movable applicator element for applying the wetting liquid to the pie crust, said applicator element being adapted to move in a predetermined path conforming to the periphery of the pie crust, a reciprocating piston in said measuring chamber, a valve controlling the flow of liquid to said measuring chamber from a reservoir and to said applicator element from said measuring chamber, a driving mechanism, means operatively associated with said driving mechanism for moving said applicator element around the periphery of the pie, means operatively associated with said driving mechanism for reciprocating said piston in synchronism with the movement of said applicator element, and means responsive to the movement of said piston for actuating said valve at predetermined intervals during the movement of said applicator element.

8. A device for wetting the peripheral edges of pie crusts, said device comprising a measuring chamber for a wetting liquid, a rotatable distributing element comprising a brush movable in contact with the periphery of the pie crust, a reciprocating piston in said measuring chamber fitting closely to the walls thereof and having a cycle comprising a suction and a compression stroke, a conduit from said measuring chamber to said distributing element, a reservoir surrounding said measuring chamber, a valve controlling the flow of liquid to said measuring chamber from said reservoir and to said distributing element from said measuring chamber, a driving mechanism, means operatively associated with said driving mechanism for rotating said distributing element continuously, means operatively associated with said driving means for reciprocating said piston in synchronism with the rotation of said distributing element, means responsive to the movement of said piston for actuating said valve at predetermined intervals during the rotation of said distributing element, said means being synchronized to open said valve to permit the flow of liquid from said reservoir to said measuring chamber during the suction stroke of said piston while simultaneously closing the conduit to said distributing element and to close said valve into said reservoir while opening said conduit during the compression stroke of said piston.

9. In the art of making pastries, the method of applying a predetermined amount of liquid to a pastry which comprises advancing the pastry in a step by step movement to a fixed working station, measuring a predetermined amount of liquid to be applied to the pastry, applying said measured amount of liquid to the pastry at said fixed station, and synchronizing the advancement of the pastry with the measurement of the liquid.

10. In the art of making pastries, the method of applying a predetermined amount of liquid to a pastry which comprises advancing the pastry in a step by step movement to a fixed working station, measuring a predetermined amount of liquid to be applied to the pastry during the time interval between each step by step advancement of the pastry, applying said measured amount of liquid to the pastry at said fixed station, and synchronizing the application of the liquid with the advancement of the pastry.

11. In the art of making pies, the steps which comprise advancing successive pie pans carrying an unbaked pie dough in a step by step movement past a fixed working station, continuously rotating a liquid applicator in a fixed path corresponding to the periphery of the pie dough at said fixed station, alternately measuring and supplying to said applicator a predetermined amount of liquid, and synchronizing said measurement and application of liquid with the step by step advancement of said pie doughs whereby said liquid is supplied to said applicator only when a pie dough is in contact therewith and said liquid is measured only during the step by step advancement.

LLOYD J. HARRISS.
BERNARD LAMBERS.